United States Patent

[11] 3,548,961

[72] Inventor Neil A. Newman
       Fond Du Lac, Wis.
[21] Appl. No. 749,528
[22] Filed Aug. 1, 1968
[45] Patented Dec. 22, 1970
[73] Assignee Brunswick Corporation
       Chicago, Ill.
       a corporation of Delaware

[54] CHASSIS CONSTRUCTION FOR GROUND-SUPPORT VEHICLES
14 Claims, 6 Drawing Figs.

[52] U.S. Cl. .................................................... 180/5,
                                                      305/27, 305/32
[51] Int. Cl. ................................................. B62m 27/00
[50] Field of Search .......................................... 180/5;
                                                      305/27, 28

[56] References Cited
UNITED STATES PATENTS
3,023,824  3/1962  Bombardier .................. 305/27
3,309,150  3/1967  Marier ........................... 180/5
3,362,492  1/1968  Hansen .......................... 180/5
3,435,907  4/1969  Imhoff ........................... 180/5
3,474,751  10/1969 Hebert .......................... 180/5

OTHER REFERENCES
Popular Mechanics - Pages 138, 139 Oct. 1967.
Johnson Skee-Horse Snowmobiles for 1968 - Advertising brochure published by Johnson Motors, Waukegan Ill. Received in Patent Office Aug. 1, 1967.

Primary Examiner—Richard J. Johnson
Attorney—Ray T. Montgomery

ABSTRACT: An improved chassis construction is disclosed for ground-support vehicles of a type having a chassis frame of sheet material. The improved chassis construction includes longitudinally extending and transversely spaced reinforcing members disposed outwardly from the ground-support drive assembly along the respective sides of the vehicle. The reinforcing members connect the ground-support drive assembly to the chassis frame and serve to distribute the load from the assembly to the frame and increase the torsional rigidity and reduce stresses in the frame.

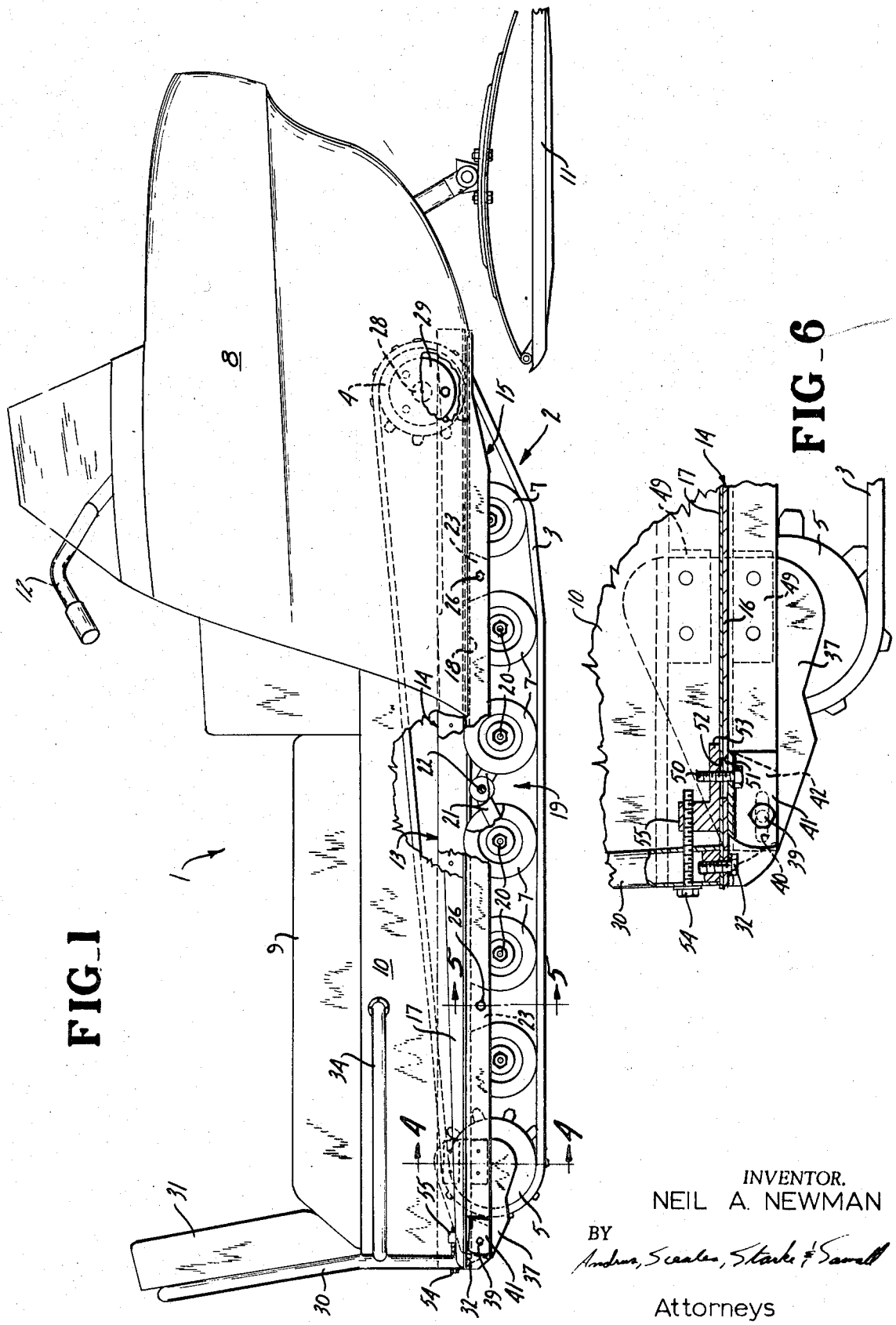

PATENTED DEC 22 1970
3,548,961
SHEET 2 OF 2
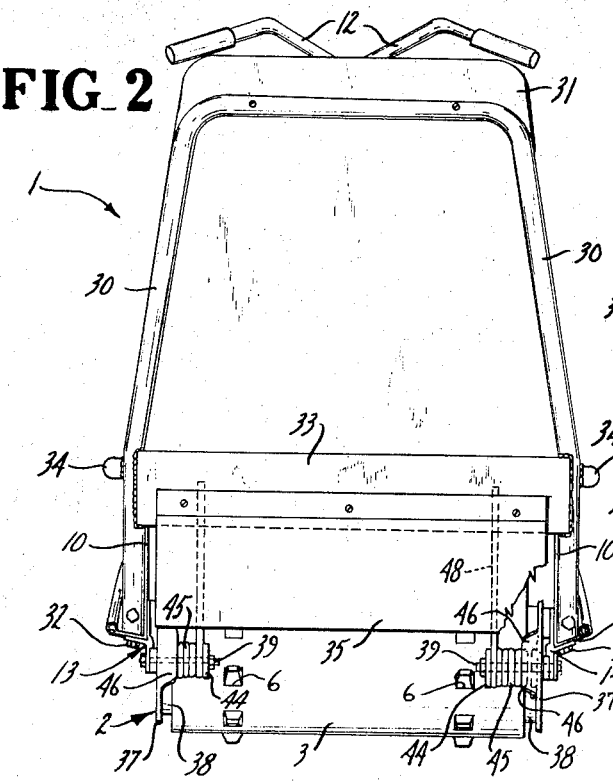
FIG_2
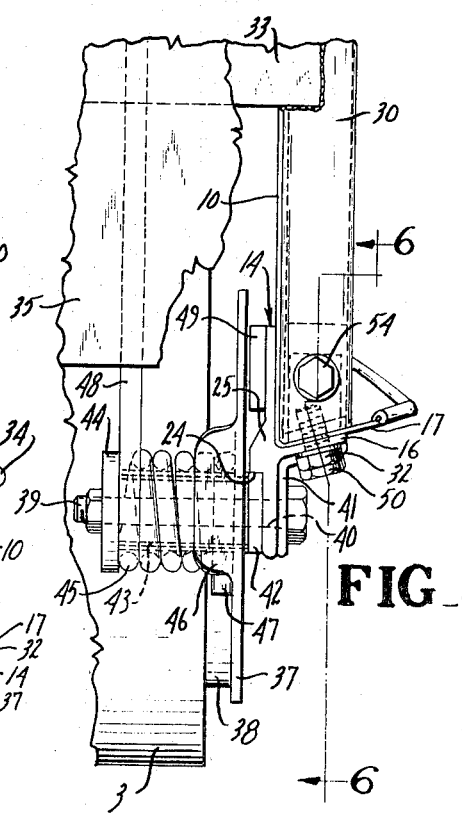
FIG_3
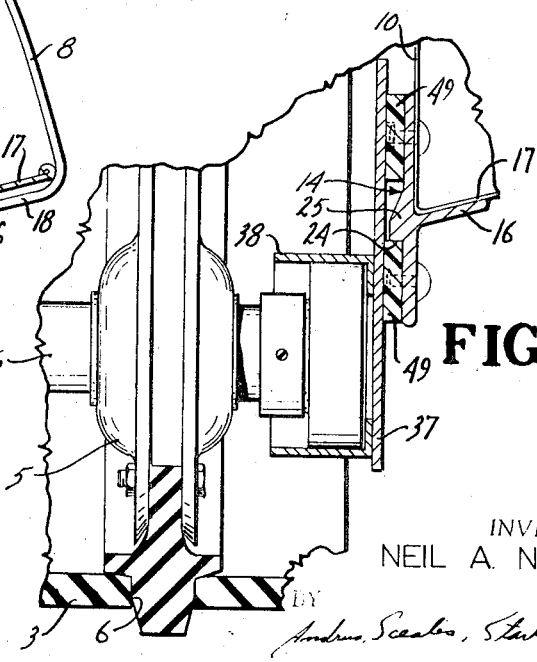
FIG_5
FIG_4
INVENTOR.
NEIL A. NEWMAN
Attorneys

CHASSIS CONSTRUCTION FOR GROUND-SUPPORT VEHICLES

This invention relates to an improved chassis construction for ground-support vehicles.

In certain types of ground-support vehicles such as snowmobiles, the chassis frame comprises a housing of sheet metal or other sheet material mounted on a ground-support drive assembly. Though the housing frame of sheet material is generally locally reinforced to accommodate the drive assembly, the loading on the housing frame from the drive assembly remains generally concentrated giving rise to areas of high stress concentration and a lack of torsional rigidity. It is generally an object of this invention to provide an improved chassis construction for a ground-support vehicle having a housing frame of sheet material wherein the drive assembly loads are better distributed in the chassis frame to reduce stresses therein as well as provide certain other advantages as will be described hereinafter.

According to the invention, a ground-support vehicle having a drive assembly and a housing frame of sheet material includes longitudinally extending, transversely spaced and aligned reinforcing members which are disposed outwardly from the drive assembly along the respective sides of the vehicle. The reinforcing members connect the ground-support drive assembly to the housing frame and serve to distribute the load from the assembly to the frame to thereby reduce the stresses in the frame and increase the torsional rigidity thereof.

The drawings furnished herewith illustrate the best mode for carrying out the invention as presently contemplated and set forth hereinafter.

In the drawings:

FIG. 1 is a side elevation of a snowmobile with parts broken away to better show the chassis construction of this invention;

FIG. 2 is an enlarged rear elevation of the snowmobile of FIG. 1;

FIG. 3 is an enlarged partial rear elevation with parts broken away and shows one side of the chassis construction;

FIG. 4 is an enlarged sectional view taken generally on line 4-4 of FIG. 1;

FIG. 5 is an enlarged sectional view taken generally on line 5-5 of FIG. 1; and

FIG. 6 is a slightly reduced sectional view taken generally on line 6-6 of FIG. 3.

Referring to the drawings, a ground-support vehicle such as the snowmobile 1 is, in the main, supported on a drive assembly 2. As shown, the drive assembly 2 includes a flexible endless track 3 which is drivingly suspended between one or more driving means such as sprockets 4 disposed forwardly relative to the vehicle and corresponding idler and/or guide sprockets 5 disposed rearwardly. The track 3 is provided with corresponding rows of openings 6 engageable by the sprocket teeth to drive the assembly 2. Support means in the form of resiliently biased wheels or rollers 7 maintain the driving surface of the track 3 intermediate the sprockets 4 and 5 substantially parallel relative to the chassis and generally flat for maximum traction.

The sprockets 4 for driving the track 3 are rotatably disposed on a fixed axis and driven by an engine, not shown, mounted under the hood of forward housing 8 of sheet metal or other sheet material. A seat 9 to accommodate one or more persons is disposed above the track assembly 2 and supported by the inverted generally U- or channel-shaped track assembly housing frame 10 of sheet metal or other sheet material.

Forwardly the vehicle 1 is resiliently supported on a pair of transversely spaced ski runners 11 which are coupled together for steering and controlled by means of the handlebar 12 convenient to the operator.

The chassis construction for the vehicle 1 includes a pair of opposed longitudinally extending, transversely spaced and aligned reinforcing members 13 and 14 which preferably comprise lightweight aluminum plate extrusions of desired section. The members 13 and 14 extend along the substantially the length of the frame 10 and along the respective sides of the vehicle outwardly from the drive assembly 2. Each reinforcing member extends along the inner surface of chassis frame 10 and includes a portion extending above and a portion extending below the lower edge of the chassis frame 10. The transversely spaced reinforcing members are tied together or connected by a plurality of transversely extending crossmembers at longitudinally spaced locations as will be more fully described hereinafter to form a frame reinforcing assembly 15 which serves to increase the torsional rigidity of housing frame 10 and reduce the stresses in the housing members 8 and 10 supported thereby.

The forward housing 8 and track assembly housing frame 10 are carried by the frame reinforcing assembly 15. The respective reinforcing members 13 and 14 are provided with an outwardly projecting rib 16 shown in the midregion of their depth which extends longitudinally over the length of the members. In the assembly of housing frame 10 onto the frame reinforcing assembly 15, the housing frame side portions extend downwardly adjacent to the outer face of corresponding reinforcing members with the foot rest or running board 17 projecting outwardly from the housing frame being seated on the rib 16 as perhaps best shown in FIG. 5. The hood or forward housing 8 extends downwardly in outwardly spaced relation from the reinforcing members 13 and 14 with the inwardly projecting lower portions 18 extending under the ribs 16. Securement of the members 8 and 10 to the reinforcing members 13 and 14 may be by bolting and riveting, as shown.

Intermediate the drive sprockets 4 and the idler sprockets 5, the track assemblage 2 includes a plurality of longitudinally spaced wheel suspension assemblies 19. Each assembly 19 includes a pair of longitudinally spaced transversely extending axle shafts 20 on each of which a pair of transversely spaced bearing wheels 7 are mounted. The shafts 20 of each assembly are carried on lever arms 21 pivotally mounted on a common transversely extending bearing shaft 22 disposed intermediate the shafts 20. The respective shafts 20 are biased downwardly by spring means, not shown, to resiliently support the vehicle in order to cushion the ride.

As shown in FIG. 5, the bearing shaft 22 of each assembly 19 extends intermediate the upper and lower runs of the endless track 3 between the spaced reinforcing members 13 and 14. The bearing shaft 22 is disposed between a pair of trapezoidal support plates 23 which are in turn disposed adjacent to the lower portion of the inside surface of the corresponding reinforcing members with the longer upper edge surface of the plates 23 bearing over their length against the downwardly facing shoulder 24 formed by the inwardly stepped projection 25 on the respective reinforcing members generally opposite from the outwardly projecting ribs 16. The support plates 23 serve to distribute the bearing shaft loads in the reinforcing members to avoid locations of unduly high stress concentration. The threaded members 26 extend through the corresponding reinforcing members and support plates and engage within the threaded end opening 27 in the bearing shafts 22 to complete a crossmember tie between the spaced reinforcing members 13 and 14. Since the snowmobile 1 shown in the drawings is provided with three wheel suspension assemblies 19, the corresponding bearing shafts 22 provide three longitudinally spaced crossmember ties for the frame reinforcing assembly 15.

The track driving sprockets 4 are fixed on the shaft 28 driven from the engine by a suitable drive train, not shown. The shaft 28 is rotatably supported in suitable bearings, not shown, retained at the respective ends of the shaft by a mounting plate assembly 29 secured at least in part to the corresponding reinforcing member to provide a crossmember tie adjacent to the forward end of assembly 15.

At the rear of snowmobile 1 an inverted generally U- or loop member 30 is transversely disposed and extends above the track assembly housing frame 10 to provide support for a back rest 31. The leg portions of loop member 30 extend downwardly along the corresponding sides of the track assembly housing frame 10 at the rear of the vehicle and terminate on the running board projection 17 supported by the reinforcing member rib projection 16. A threaded member 32 extends upwardly through the rib projection 16 and running board projection 17 and into the corresponding leg portion of loop member 30 to complete a further crossmember tie for the frame reinforcing assembly 15. The rear crossmember tie for assembly 15 is further strengthened by a transversely extending bracing member 33 which connects the leg portions of loop member 30 generally in alignment with the upper transverse portion of the track assembly housing frame 10. Hand rails 34 are provided on opposite sides of the vehicle and extend forwardly from the leg portions of loop member 30 in spaced relation above the reinforcing members and are secured to the corresponding side of the track assembly housing frame 10 to further support the loop member. The track assembly housing frame 10 is generally open rearwardly and a flexible spray guard 35 hangs over the opening from the bracing member 33.

The guide sprockets 5 at the rear end of the track assembly 2 are carried on the transversely extending shaft 36 the respective ends of which are supported by corresponding lever arm plates 37. As shown in FIG. 4, the lever arm plates 37 carry an inwardly facing bearing retainer 38 to house a suitable bearing in which the shaft 36 is journaled.

The respective lever arm plates 37 are independently supported for pivotal movement from the corresponding reinforcing members 13 and 14. Describing the lever arm plate assembly mounting relative to reinforcing member 14 as generally shown in FIGS. 3 and 6, the bolt 39 extends through a longitudinally extending slot 40 in the portion of the reinforcing member beneath the opposed projections 25 and 16 with the reinforcing member being sandwiched between a bearing plate 41 on the outside thereof and a support plate 42 on the inside. The bearing plate 41 is generally L-shaped and bears as well against the lower surface of the outer rib projection 16 while the upper surface of plate 42 bears against the downwardly facing shoulder 24 of projection 25. A spacing collar 43 is disposed on bolt 39 between the plate 42 and washer 44 to provide an assembly which tends to maintain the bolt 39 in proper normal orientation relative to reinforcing member 14 when drawn tightly together by a nut. The pivotal lever arm plate 37 and coiled torsion spring 45 are disposed on collar 43 intermediate the plate 42 and washer 44. Relative rotation between the outer coil of spring 45 and the lever arm plate 37 is precluded by plate projection 46 which is engaged by a tangential end projection 47 from the coil immediately adjacent to the plate. The opposed end of spring 45 is provided with a relatively long tangential end projection 48 from the innermost coil which extends upwardly and engages behind the forward face of the bracing member 33. The spring 45 torsionally biases the lever arm plate 37 to move the guide sprocket shaft 36 downwardly to maintain the tension on track 3. The mounting of the lever arm plate assembly relative to reinforcing member 13 is generally similar to the mounting as described relative to reinforcing member 14.

Flectional movements of the track 3 in response to dynamic forces resulting from rough or uneven terrain and steering maneuvers impose side thrust loads on the lever arm plates 37. Side thrust movements by plates 37 are limited in the outward direction by engagement of the plates with one or more wear plates 49, preferably made of plastic or other bearing material, disposed on the inside face of the reinforcing members. As perhaps best shown in FIGS. 4 and 6, two vertically spaced wear plates 49 on the reinforcing members are engageable by the forward portions or free ends of the corresponding lever arm plates 37. The lower of the two wear plates 49 is disposed beneath the shoulder 24 of projection 25 while the upper wear plate is disposed above the projection. The thickness of the wear plates 49 assures that the lever arm plates 37 will remain out of contact with the reinforcing members.

The lever arm plates 37 are normally secured in a given position of adjustment providing the desired tension for track 3. Such securement is made relative to the corresponding reinforcing member by the threaded members 39 and 50. The threaded member 50 extends upwardly through the outwardly projecting leg of bearing plate 41 which carries the bolt 39 and which bears against the lower surface of rib projection 16 of the respective reinforcing members. The threaded member 50 passes through vertically aligned longitudinally extending slots 51 and 52 in the rib projection 16 and the track housing running board projection 17, respectively, and threadedly engages within the plate 53 disposed above the running board projection. When threaded member 50 is drawn up tight, the rib projection 16 and running board projection 17 are sandwiched and securely clamped between the plates 41 and 53 to preclude any movement longitudinally by the lever arm plate 37.

When an adjustment of the tension in track 3 is desired, on either side of the vehicle, the corresponding threaded members 50 and 39 must be loosened. With the threaded members 50 and 39 loosened, the plates 53 and 41 are slidable together relative to the corresponding reinforcing member rib projection 16 with the threaded member 50 being movable in the aligned slots 51 and 52. With movement of plates 53 and 41, there will be corresponding movement of the lever arm plate 37 through the bolt 39 carried by plate 41 and which is longitudinally movable relative to slot 40 in the reinforcing member.

After loosening threaded members 50 and 39, the lever arm plate is moved to adjust track tension by means of the corresponding threaded member 54 extending longitudinally through the leg of loop member 30 and threadedly engaged within the upward projection 55 from the corresponding plate member 53 slidable on the running board projection 17. After a desired adjustment in track tension has been made by the threaded member 54, the threaded members 50 and 39 are again drawn up tight to secure the lever arm plate 37 against longitudinal movement.

In the vehicle chassis construction of this invention, the transversely spaced reinforcing members serve to distribute the loads from the drive assembly to the housing frame to increase the torsional rigidity and reduce stresses in the housing frame so that the vehicle is better able to withstand the buffeting frequently offered by the terrain. In the structure, the drive assembly bearing loads are distributed to the reinforcing members 13 and 14 by the support plates 23, and from the reinforcing members to the chassis housing frame. The reinforcing members further serve to support and stiffen the foot rests or running boards of the vehicle, and being of greater strength than the housing frame material, the reinforcing members are ideally suited to carry the track tension loads and limit the guide sprocket side play.

claim:

1. In a vehicle, a ground-support drive assembly and rear idler wheel assembly, an inverted U-shaped chassis frame having a longitudinally extending flange projecting outwardly from the lower edge of the respective sides of said frame to form a running board, said frame being formed of sheet material and covering the ground support drive assembly, and separate longitudinally extending, transversely spaced reinforcing members disposed outwardly from the ground-support drive assembly along substantially the length of the respective sides of the chassis frame and connecting the ground-support drive assembly and rear idler wheel assembly to the chassis frame, said reinforcing members including a portion extending along the inner surface of the frame and including a laterally extending reinforcing flange, said reinforcing members serving to distribute the load from the assembly to the frame and increase the torsional rigidity and reduce stresses in the frame.

2. The invention as set forth in claim 1 wherein the ground-support drive assembly comprises a track assembly including an endless track suspended between longitudinally spaced drive means and guide means for said track, and support means for the lower run of the track intermediate said drive and guide means.

3. In a vehicle, a drive track assembly comprising an endless track suspended between longitudinal spaced drive sprocket means and guide sprocket means, a rear idler wheel assembly, and support means for the lower run of the track intermediate said sprocket means; an inverted U-shaped chassis frame having a longitudinally extending flange projecting outwardly from the lower edge of the respective sides of said frame to form a running board, said frame being formed of sheet material and covering said drive track assembly; separate longitudinally extending and transversely spaced reinforcing members disposed outwardly from the drive track assembly along substantially the length of the respective sides of the chassis frame and supporting said chassis frame; and crossmember means extending transversely between said spaced reinforcing members and suspending the track assembly support means and rear idler wheel assembly; said reinforcing members including a portion extending along the inner surfaces of the respective sides above and below the lower edges of the frame and including a laterally extending reinforcing flange, said reinforcing members and said crossmember means together comprising a reinforcing assembly for said chassis frame serving to distribute the load from the drive track assembly to the frame and increase the torsional rigidity and reduce stresses in the frame.

4. The invention as set forth in claim 3 wherein the support means for the lower run of the track comprises a plurality of bearing wheel assemblies each of which is suspended from a transversely extending crossmember means.

5. The invention as set forth in claim 3 wherein the drive sprocket means of the drive track assembly is supported at least in part between said reinforcing members generally forwardly relative to the vehicle and wherein the drive track assembly is provided with tensioning means for the endless track generally rearwardly relative to the vehicle, said track tensioning means being carried by the reinforcing members which serve as compression members to carry the track tension load.

6. The invention as set forth in claim 5 wherein the track tensioning means include transversely spaced lever arm members supporting the track assembly guide sprocket means therebetween, each said lever arm member being pivotally supported by the corresponding reinforcing member and biased to provide for the desired track tension.

7. The invention as set forth in claim 6 wherein the respective pivotal track tensioning lever arm members are pivotally mounted on shaft means supported by the corresponding reinforcing member, the shaft means for each lever arm member being adjustably movable relative to a longitudinal slot in the respective reinforcing members to adjust the track tension as desired, and means to secure the respective lever arm member support shaft means to the corresponding reinforcing members in any position of track adjustment.

8. In a vehicle, a drive track assembly comprising an endless track suspended between longitudinally spaced drive sprocket means and guide sprocket means, and a plurality of longitudinally spaced bearing wheel assemblies intermediate said sprocket means to provide rolling support for the lower run of the track with each wheel assembly being suspended from a transversely extending bearing shaft; an inverted U-shaped chassis frame of sheet material covering said drive track assembly; separate longitudinally extending and transversely spaced reinforcing members disposed outwardly from the drive track assembly along substantially the length of the respective sides of the chassis frame and supporting said chassis frame; the respective reinforcing members having an inwardly directed longitudinally extending projection in spaced relation from the bottom edge of said members to provide a downwardly facing bearing shoulder; and plate means supporting the wheel assembly bearing shafts and being secured to the corresponding reinforcing members with the upper surface of said plate means disposed in engagement with the corresponding bearing shoulder to distribute the bearing shaft loads to the reinforcing members and chassis frame.

9. In a vehicle, a ground-support drive assembly, an inverted U-shaped chassis frame of sheet material covering the ground-support drive assembly and having a longitudinally extending flange projecting outwardly along the lower edge of the respective sides of said frame to form a running board, and separate longitudinally extending, transversely spaced reinforcing members disposed outwardly from the ground-support drive assembly along substantially the length of the respective sides of the chassis frame and having a longitudinally extending outwardly projecting flange, said channel-shaped chassis frame being assembled on two said reinforcing members with respective running board flanges seating on the corresponding flanges of said reinforcing members to support and stiffen the respective running boards, said reinforcing members also serving to distribute the load from the assembly to the frame and increase the torsional rigidity and reduce stresses in the frame.

10. In a vehicle, a ground-support drive assembly including transversely extending crossmember means, an inverted U-shaped chassis frame of sheet material covering the ground-support drive assembly, and separate longitudinally extending, transversely spaced reinforcing members disposed outwardly from the ground-support drive assembly along substantially the length of the respective sides of the chassis frame and connecting the ground-support drive assembly to the chassis frame, each reinforcing member having an inwardly directed longitudinally extending projection in spaced relation from the bottom edge of said members to provide a downwardly facing bearing shoulder, said reinforcing members serving to distribute the load from the assembly to the frame and increase the torsional rigidity and reduce stresses in the frame, and plate means supporting the crossmember means of said drive assembly and being secured to the corresponding reinforcing members with the upper surface of the plate means disposed in engagement with the corresponding bearing shoulder to distribute the bearing shaft loads to the reinforcing members and chassis frame.

11. In a vehicle, a drive track assembly comprising an endless track suspended between longitudinally spaced drive sprocket means and guide sprocket means, and support means for the lower run of the track intermediate said sprocket means; an inverted U-shaped chassis frame of sheet material covering said drive track assembly and including a longitudinally extending flange which projects outwardly along the lower edge of the respective sides of said frame to form a running board; separate longitudinally extending and transversely spaced reinforcing members disposed outwardly from the drive track assembly along substantially the length of the respective sides of the chassis frame and supporting said chassis frame, said reinforcing members having a longitudinally extending outwardly projecting flange, said chassis frame being assembled onto said reinforcing members with the respective running board flanges seating on the corresponding flanges of said reinforcing members whereby to support and stiffen the respective running boards; and crossmember means extending transversely between said spaced reinforcing members and suspending the track assembly support means; said reinforcing members and said crossmember means together comprising a reinforcing assembly for said chassis frame serving to distribute the load from the drive track assembly to the frame and increase torsional rigidity and reduce stresses in the frame.

12. In a vehicle, a drive track assembly comprising an endless track suspended between longitudinally spaced drive sprocket means and guide sprocket means, and support means for the lower run of the track intermediate said sprocket means; an inverted U-shaped chassis frame of sheet material covering said drive track assembly; separate longitudinally extending and transversely spaced reinforcing members disposed outwardly from the drive track assembly along substantially the length of the respective sides of the chassis frame and supporting said chassis frame, the drive sprocket means of the track assembly being supported at least in part between said reinforcing members generally forwardly relative to the vehicle; and crossmember means extending transversely between said spaced reinforcing members and suspending the track assembly support means, said reinforcing members and said crossmember means together comprising a reinforcing assembly for said chassis frame serving to distribute the load from the drive track assembly to the frame and increase the torsional rigidity and reduce stresses in the frame, the drive track assembly being provided with tensioning means for the endless track generally rearwardly relative to the vehicle, said track tensioning means being carried by the reinforcing members which serve as compression members to carry the track tension load, the track tensioning means including transversely spaced lever arm members supporting the track assembly guide sprocket means therebetween, each said lever arm member being pivotally supported by the corresponding reinforcing member and biased to provide for the desired track tension, said arm members being subjected to side thrust loads due to dynamic forces on said track resulting from rough or uneven terrain and steering maneuvers, and said track tensioning means including wear plate means carried by the respective reinforcing members oppositely from the free ends of the corresponding lever arm members, said wear plate means being engaged during side thrust movements by the corresponding lever arm members to limit the movement of said members.

13. In a vehicle, a drive track assembly comprising an endless track suspended between longitudinally spaced drive sprocket means and guide sprocket means, and support means for the lower run of the track intermediate said sprocket means; an inverted U-shaped chassis frame of sheet material covering said drive track assembly; separate longitudinally extending and transversely spaced reinforcing members disposed outwardly from the drive track assembly along substantially the length of the respective sides of the chassis frame and supporting said chassis frame, the respective reinforcing members having an inwardly directed longitudinally extending projection in spaced relation from the bottom edge of said members to provide a downwardly facing bearing shoulder; crossmember means extending transversely between said spaced reinforcing members and supporting the track assembly support means; and plate means supporting the cross member means suspending the track assembly support means, said plate means being secured to the corresponding reinforcing members with the upper surface of the plate means disposed in engagement with the corresponding bearing shoulder to distribute the bearing shaft loads to the reinforcing members and chassis frame; said reinforcing members and said crossmember means together comprising a reinforcing assembly for said chassis frame serving to distribute the load from the drive track assembly to the frame and increase torsional rigidity and reduce stresses in the frame.

14. The invention as set forth in claim 13 wherein the chassis frame includes a longitudinally extending flange which projects outwardly along the lower edge of the respective sides of said frame to form a running board, and wherein said reinforcing members have a longitudinally extending and outwardly projecting flange, said chassis frame being assembled onto said reinforcing members with the respective running board flanges seating on the corresponding flanges of said reinforcing members whereby to support and stiffen the respective running boards, said inwardly directed projection and outwardly projecting flange on the respective reinforcing members being generally transversely aligned.